United States Patent
Petrounevitch

(10) Patent No.: US 9,222,460 B2
(45) Date of Patent: Dec. 29, 2015

(54) CONVEYOR-TYPE SYSTEM FOR GENERATING ELECTRICITY FROM WATER CURRENTS

(76) Inventor: Edouard Petrounevitch, Toronto (CA)

(*) Notice: Subject to any disclaimer, the term of this patent is extended or adjusted under 35 U.S.C. 154(b) by 1323 days.

(21) Appl. No.: 12/450,298

(22) Filed: Sep. 21, 2009

(65) Prior Publication Data

US 2011/0068580 A1  Mar. 24, 2011

(51) Int. Cl.
*F01D 1/02* (2006.01)
*F03B 17/06* (2006.01)

(52) U.S. Cl.
CPC ........... *F03B 17/066* (2013.01); *F05B 2240/12* (2013.01); *F05B 2240/40* (2013.01); *F05B 2240/93* (2013.01); *Y02E 10/28* (2013.01)

(58) Field of Classification Search
CPC ........... F01D 1/02; F01D 1/023; F01D 1/026; F03B 13/10; F03B 13/105
USPC ........................................ 60/398; 290/43, 54
See application file for complete search history.

(56) References Cited

U.S. PATENT DOCUMENTS

| | | | | |
|---|---|---|---|---|
| 3,992,125 A * | 11/1976 | Schilling | | 415/5 |
| 4,494,008 A * | 1/1985 | Patton | | 290/44 |
| 5,789,826 A * | 8/1998 | Kumbatovic | | 290/43 |
| 6,454,546 B1 * | 9/2002 | Huang | | 60/398 |
| 6,954,006 B2 * | 10/2005 | Williams | | 290/43 |
| 7,847,425 B2 * | 12/2010 | Lok | | 60/398 |
| 2010/0283250 A1 * | 11/2010 | Capone et al. | | 290/54 |

* cited by examiner

*Primary Examiner* — F. Daniel Lopez

(57) ABSTRACT

A modular system for producing electricity from water currents is disclosed. Each module contains a submersible water current energy converter and a self-adjusting buoyant mooring mechanism. The converter consists of a pair of contra-rotating conveyor-type turbines, connected to electrical generators, and a water flow accelerator. Each turbine comprises a conveyor mechanism, which is mounted via bearings on inner vertically-oriented shafts to a protecting housing, and a plurality of rectangular-shaped blades (preferably three), which are held by blade support members in the position maximizing the turbine's performance. The system module is capable of self-adjusting to the optimal position in water currents, vertically with changing water levels and horizontally, depending on the direction of a water flow. It uses a simple anchoring mechanism and can be easily relocated. An array of these modules can be connected to an underwater transmission line to create a robust and cost-effective power generation system.

2 Claims, 5 Drawing Sheets

CONVEYOR-TYPE SYSTEM FOR GENERATING ELECTRICITY FROM WATER CURRENTS

FIELD OF THE INVENTION

This invention relates to modular systems for producing electricity from the kinetic energy present in free-flowing water.

BACKGROUND

Hydropower is well known as the most applied and the largest renewable energy source in the production of electricity. However, conventional hydropower is constrained by high up-front capitalization, land use requirements, and other environmental concerns.

Hydrokinetic energy systems are considered to be a valuable additional source of the sustainable power production. In a hydrokinetic energy system, the kinetic energy of free-flowing water is transformed into mechanical energy using an underwater turbine. The mechanical energy can then be used to turn a generator to produce electrical energy or to power another device such as a water pump.

Hydrokinetic energy systems may operate in oceans, rivers, or manmade channels. These systems utilize the water stream's natural pathway. There is no need for a dam, impoundment or major civil work to change the landscape or disturb the local ecology. Furthermore, generation of electrical power in these systems does not result in toxic by-products.

The most desirable hydrokinetic system must be able to produce the required amount of electricity and be optimal in terms of cost, size, weight, and reliability. Another essential quality of such system is its modular design.

A modular hydrokinetic system is made up of a number of standardized units or modules, that can be fitted together to construct a large power system in a variety of ways. An additional advantage of modular technology is that particular modules can be interchanged, added to, or removed from the system as required. This provides a time advantage for installation, modification, repairs, and maintenance, thereby insuring that the system is more cost-competitive.

Furthermore, there are a large number of streams and small rivers with significant water flows. It would be advantageous to have a modular constructed flexible hydrokinetic system that is suitable for use in such deep and shallow water flows.

Thus there is a need for a robust hydrokinetic energy system that meets the above-mentioned criteria. The present invention is intended to satisfy that need.

DESCRIPTION OF PRIOR ART

Examples of conveyor-type hydrokinetic devices are disclosed in U.S. Pat. No. 5,684,335 and in the International Patent Application No. PCT/US2004/028916 (WO 2006/028454).

In general, devices such as these suffer from low efficiency. It would be advantageous to improve the efficiency of these apparatuses by:
  Acceleration of the incoming water flow;
  Improved configuration of the conveyor-type mechanism;
  Improved arrangement of the turbine blades;
  Vertical and horizontal self-adjustment of system modules to an optimal position in the path of a water flow.

Furthermore, there is a need for a mobile hydrokinetic system module, which does not require complex anchoring mechanisms, and thus can be easily relocated.

This invention achieves the abovementioned goals. In this respect, the water current energy conversion system according to the present invention substantially departs from the conventional concepts and designs of the prior art, and in doing so provides a cost-effective solution primarily developed for the purpose of generating electricity from both deep and shallow water currents.

OBJECTS OF THE PRESENT INVENTION

The main object of the present invention is to create a new and more practical conveyor-type system for harvesting kinetic energy of water currents, by overcoming the limitations of the known apparatuses.

Another object of this invention is to increase the entire system efficiency through the increase of a turbine's efficiency by employing a vertical axis conveyor-type hydro turbine having a novel arrangement of the conveyor mechanism and turbine's blades.

It is a further object of the invention to produce a system module for generating electricity which is capable of self-adjusting to an optimal position in the water current, consequently further increasing the entire system efficiency.

Lastly, it is an object of the present invention to produce a new robust and cost-effective system module for generating electricity from both deep and shallow water currents, which does not require complex anchoring mechanisms and thus can be easily relocated, hence providing a vast number of possible site-locations for installation of such a device.

These and other objects of the present invention will become readily apparent upon further review of the following specification and drawings.

SUMMARY OF THE INVENTION

The present invention provides a modular system for producing electricity from the kinetic energy present in flowing water. This system may operate in oceans, rivers or manmade channels.

In the shown embodiment, the system comprises a set of interconnected modules. Each module contains a submersible water current energy converter and a self-adjusting buoyant mooring mechanism. The converter consists of a turbine unit and a water flow accelerator.

The turbine unit includes a pair of contra-rotating conveyor-type turbines positioned in a protecting housing.

Each turbine comprises a conveyor mechanism, which is mounted via bearings on inner vertically-oriented shafts to the protecting housing, and a plurality of fin-shaped blades (preferably three), which are held by blade support members in the position maximizing the turbine's performance.

The conveyor mechanism contains an endless loop flexible element, for example a pair of chains, passing between the sprockets mounted on said shafts. For the most efficient utilization of the incoming water current, the resting side of the turbine is separated from its power generating side by a vertically oriented panel located insight the conveyor mechanism between said shafts.

Each blade support member resembles a step ladder, consisting of two hinged sections forming an inverted V-configuration. The base ends of each section are pivotally mounted to the chains' attachments at regular intervals from one another.

The blades have a vertical orientation and a rectangular-like geometry. Each blade is pivotally mounted by its leading edge to the outer end of the respective support member. The trailing sections of the blade support members also serve as stops, thus limiting free rotation of the blades on the power generating side of the turbine.

Such arrangement allows interception of the incoming water flow nearly completely on the power generating side while minimizing the blades' friction on the resting side of the turbine, thus maximizing the turbine's performance.

Said vertically-oriented shafts can be coupled to electrical generators to transform the mechanical energy of turbines into electricity.

The V-shaped water flow accelerator has a gradually decreasing rectangular cross-section. The accelerator directs the incoming water flow through the working parts of the turbines, while blocking the opposite (resting) parts of the turbines from incoming water and forcing said turbines to turn in mutually opposite directions. The inlet of the accelerator, having the form of a rectangular pyramid, is covered by filter panels to prevent clogging of the module as well as fish entrapment. The small cross-sectional area of the accelerator's outlet is incorporated into the front panel of the turbine unit.

The turbine unit's protecting housing comprises a strong frame, which supports the turbines and electrical generators. Two counter-rotating turbines are mounted side by side in order to neutralize the twisting moment produced by each turbine.

The systems module is capable of self-adjusting to the optimal position in water currents, vertically with the changing water levels and horizontally depending on the direction of a water flow. Consequently, this self-adjusting ability further increases the entire system efficiency. Additionally, the system module uses a simple anchoring mechanism and thus can be easily relocated. This gives a time advantage for installation and maintenance.

An array of these modules can be connected to an underwater transmission line, thus providing versatile forms of robust hydroelectric power systems which are inexpensive to build, install and maintain.

The present invention, unlike the previous efforts to generate electricity from water currents, is practical and economical because its design uses a new cost-effective water current energy converter which surpasses the efficiencies of the known free-flow hydro energy devices. This invention covers a wide market segment around the globe—the areas with ocean, river, or channel currents.

DETAILED DESCRIPTION OF THE INVENTION

The preferred embodiment is the system assembly comprising an array of interconnected buoyant unidirectional modules. Each module employs a water current energy converter, which contains a pair of contra-rotating vertical axis conveyor-type turbines, and a water flow accelerator with a common funneling channel for both turbines.

Figure 10:
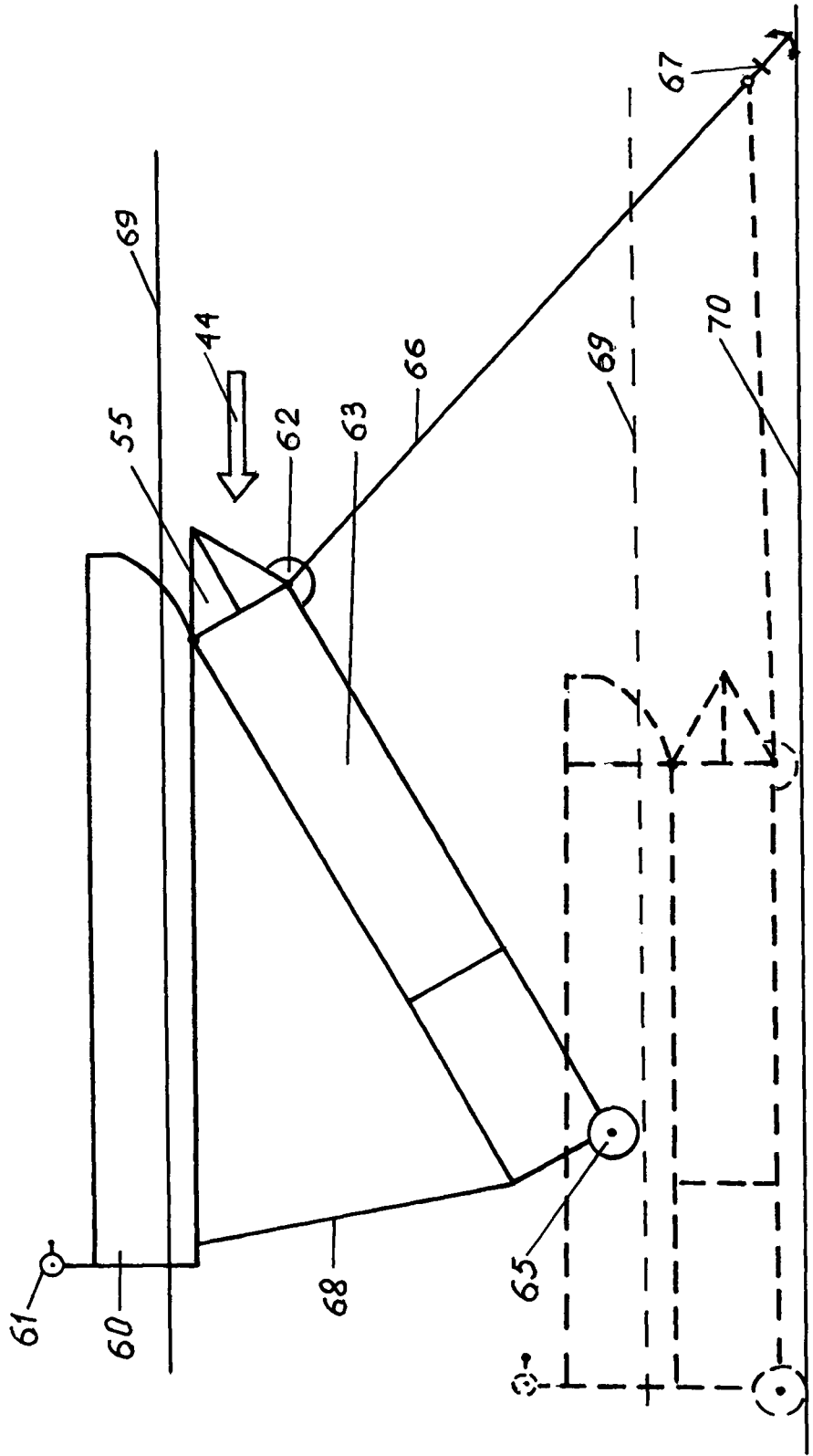
FIG. 10 is a schematic view of the mooring configuration.

The system module (FIGS. 1 and 10) is capable of self-adjustment to changing water flow conditions. It contains a submerged water current energy converter and a self-adjusting buoyant mooring mechanism.

The converter (FIG. 1 through 3) includes the detachable turbine unit 21 and the detachable water flow accelerator 22.

The turbine unit 21 (FIGS. 2 and 3) contains a pair of contra-rotating vertical axis conveyor-type turbines 23 and 24 positioned in a protecting housing 32. Said turbines are connected to the detachable electrical generators. The turbine 23 is connected to the generators 25 and 26, while the turbine 24 is connected to the generators 27 and 28.

Figure 4:
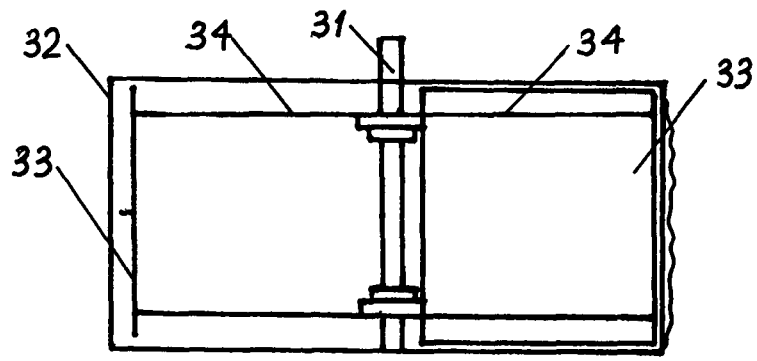
FIG. 4 is a frontal view of the vertical axis conveyor-type hydro turbine.
Figure 5:
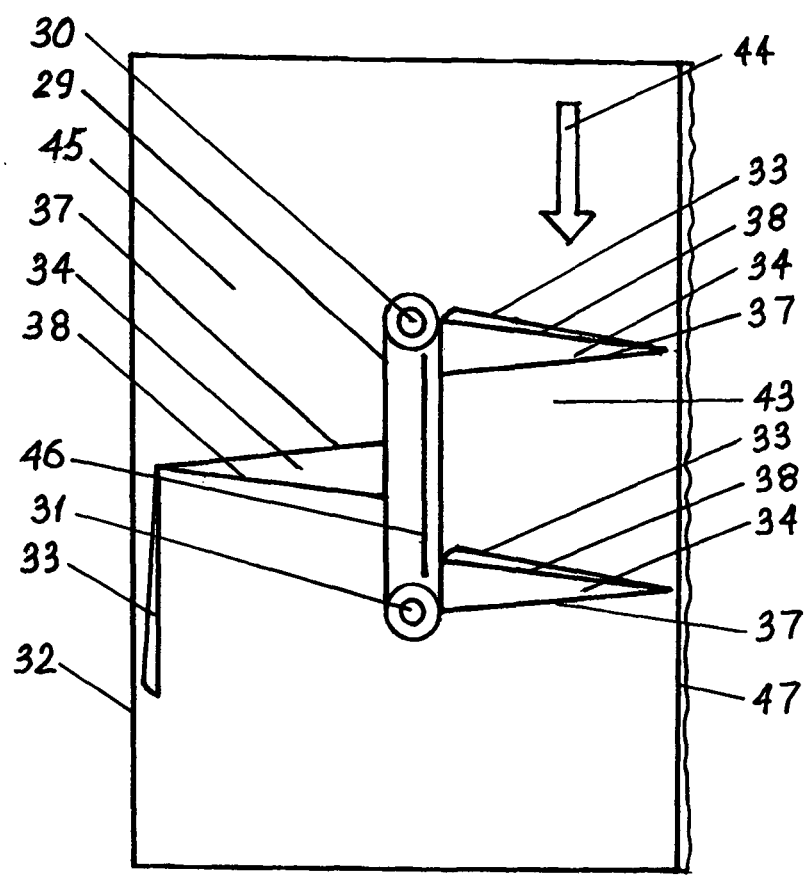
FIG. 5 is a top view of FIG. 4.
Figure 6:
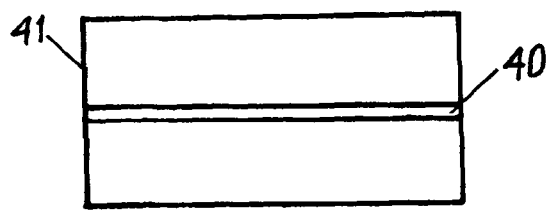
FIG. 6 is a frontal view of the blade.
Figure 7:
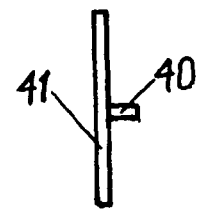
FIG. 7 is a side view of FIG. 6.
Figure 8:
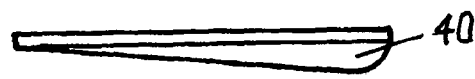
FIG. 8 is a top view of FIG. 6.

Each turbine (FIGS. 4 and 5) comprises a conveyor mechanism 29, which is mounted via bearings on inner vertically-oriented shafts 30 and 31 to the protecting housing 32, and a plurality of fin-shaped blades 33 (preferably three) with a self-adjusting pitch. Each said blade is held by a corresponding blade support member 34 (FIG. 9) in the position maximizing the turbine's performance.

The conveyor mechanism 29 contains an endless loop flexible element, for example a pair of chains 35 and 36 (FIG. 9), passing between sprockets mounted on shafts 30 and 31.

Each blade support member 34 (FIG. 9) resembles a step ladder, consisting of two hinged sections 37 and 38 forming the inverted V-configuration. The base ends of each section are pivotally mounted to the chains' attachments 39. The crossbars 49 provide added strength and durability to the sections. The support members are positioned at regular intervals from one another along said attachments.

Figure 9:
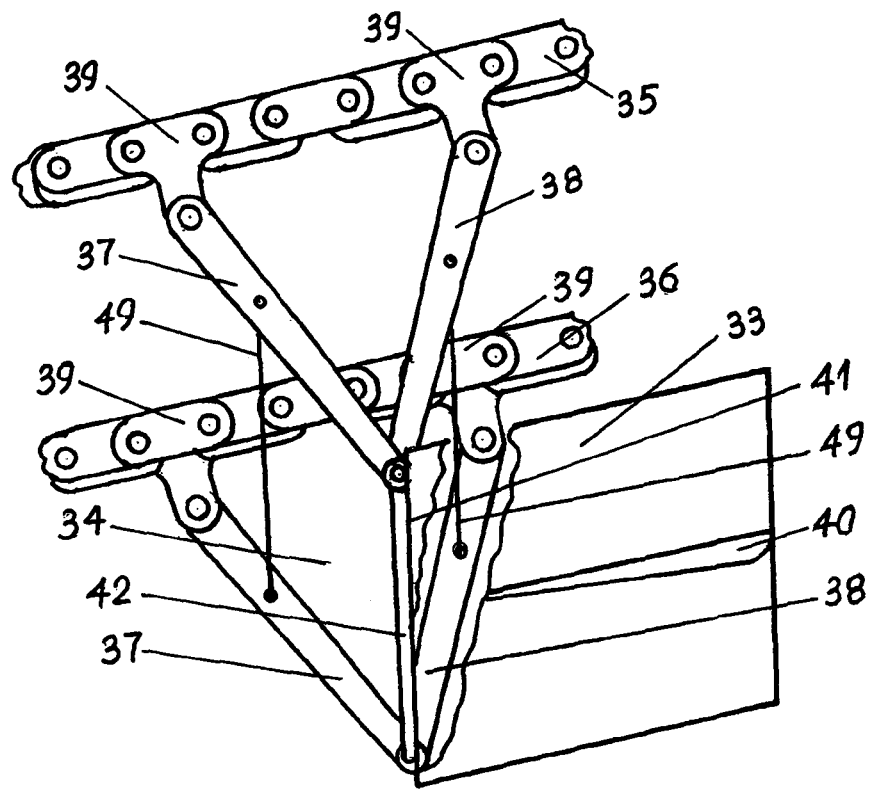
FIG. 9 is a schematic view of the blade support member.

Each blade 33 (FIG. 6 through 9) has a vertical orientation and a rectangular-like geometry. Said blades can be made from any suitable material, such as steel, aluminum, plastic, or fiberglass. Each blade contains a fin 40 that increases the structural strength of the blade and ensures the turbine's self-starting capability. As shown in FIG. 9, each blade 33 is pivotally mounted by its leading edge 41 to the hinge axis 42 of the respective support member.

The trailing section 38 of each support member 34 limits the free rotation of the corresponding blade on the power generating side 43 (FIG. 5) of the turbine in order to maximally intercept the incoming water current 44. Such arrangement creates the maximal drag force on the power generating side 43 while minimizing the blades' friction on the resting side 45 of the turbine, thus maximizing the turbine's performance.

The turbine unit's protecting housing 32, shown in FIGS. 1 through 5, is a strong frame in the shape of a right prism. The protecting housing supports the turbines 23-24 as well as the submersible electrical generators 25-28. Flat screen panels cover the frame's left and right sides, top, bottom, and partially front. Therefore, a central part of the front side is left open to the incoming water flow, while the back side is open for the water outflow. For the most efficient utilization of the incoming water current 44, the turbines 23 and 24 are separated from each other by the vertically oriented flat panel 47. Additionally, the power generating side 43 of each turbine is separated from its resting side 45 by the vertically oriented flat panel 46 which is located inside the conveyor mechanism 29 between the shafts 30 and 31. All abovementioned panels serve to improve the efficiency of the converter by creation of a funneling channel together with the flow accelerator 22.

Figure 1:
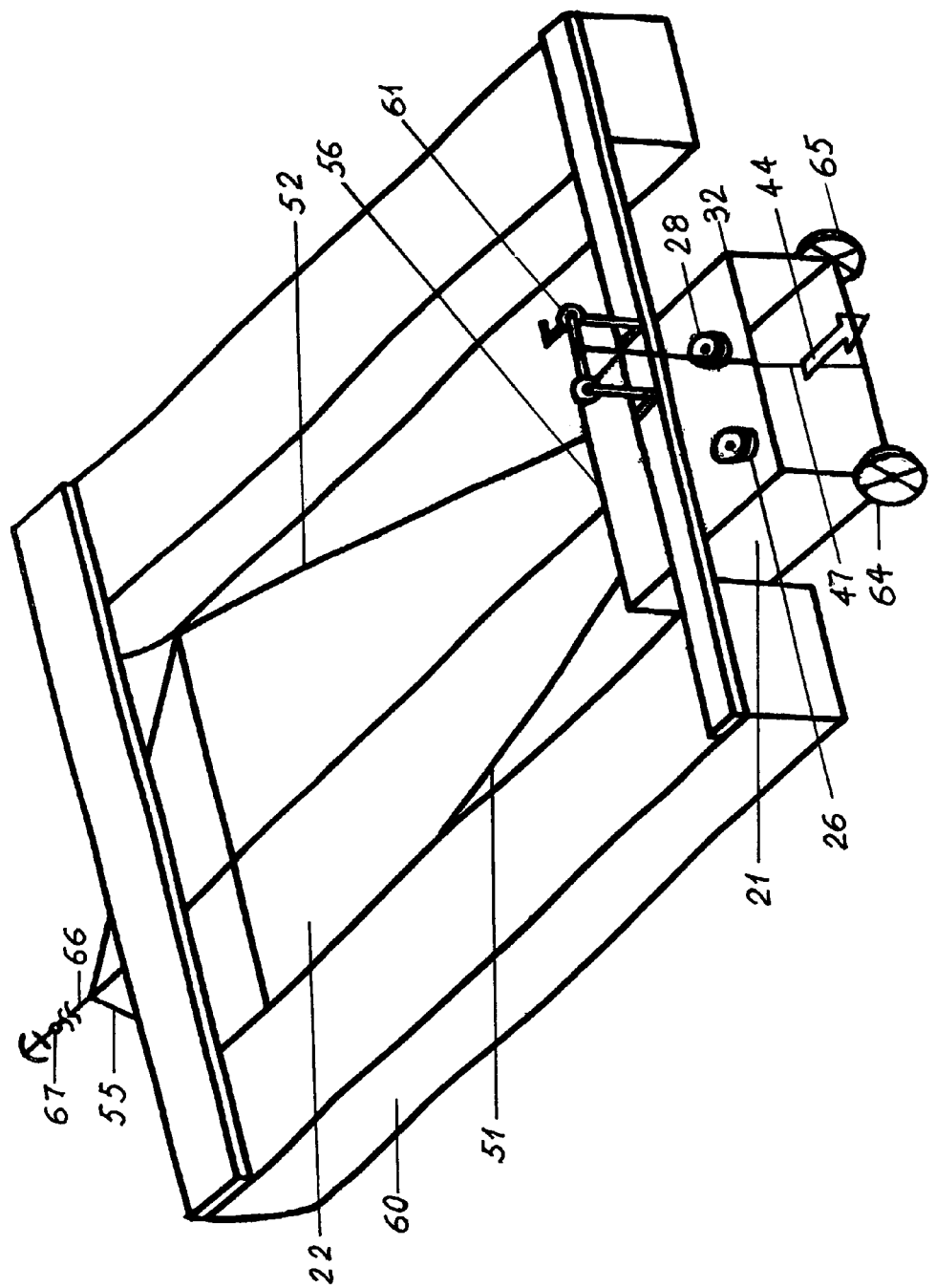
FIG. 1 is a schematic view of the self-adjusting system module for harvesting the kinetic energy from water currents.
Figure 2:
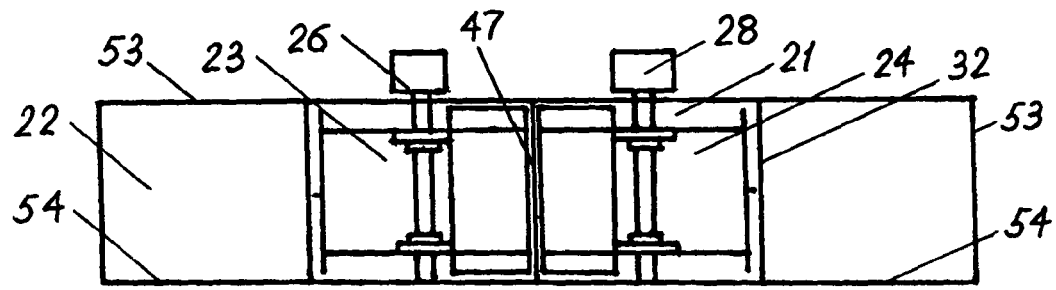
FIG. 2 is a plain frontal view of the water current energy converter.
Figure 3:
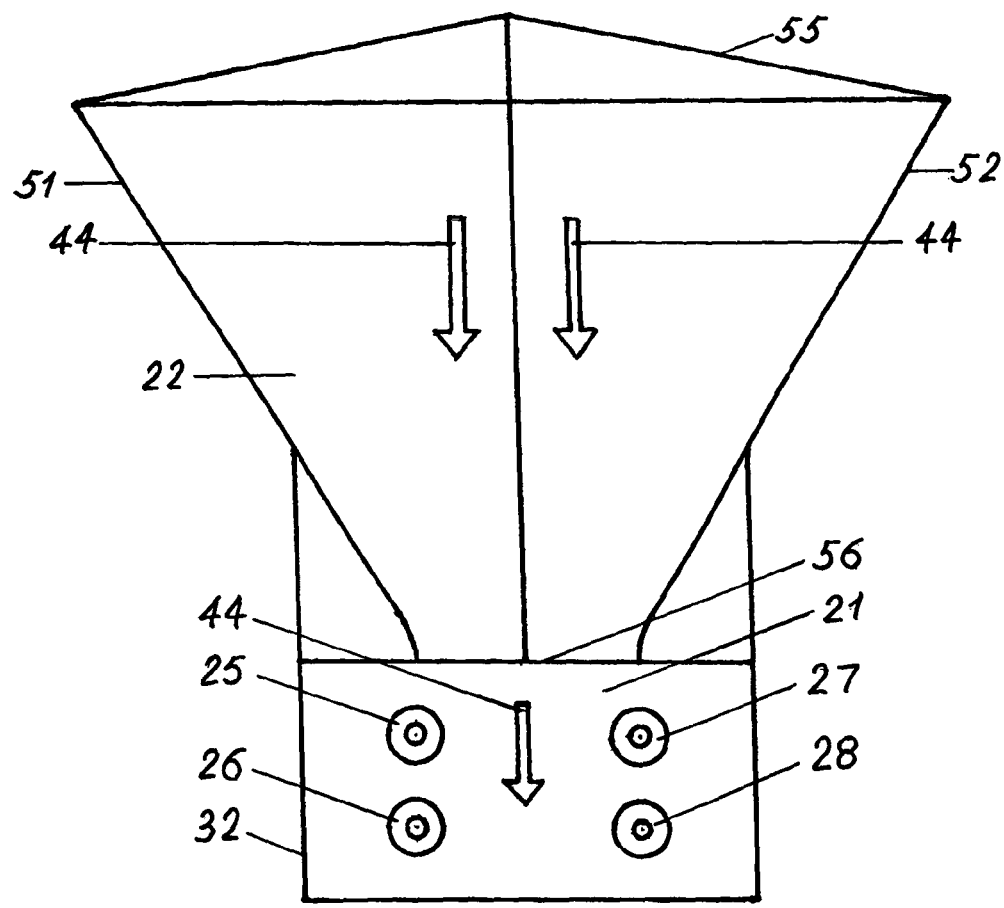
FIG. 3 is a top view of FIG. 2.

Power available from a turbine increases as the cube of the water flow velocity. If the velocity is doubled, the available power then increases by a factor of eight. It is therefore important to make use of velocities that are as high as possible, which would enable the number of turbines to be significantly reduced, and this would have a marked effect on the capital cost. This is achieved through the use of the V-shaped water flow accelerator 22 (FIGS. 1 through 3).

Screen panels 51 and 52 cover the right and left sides of the accelerator. The top and bottom sides of the accelerator are covered by the pair of screen panels 53 and 54. An inlet of the accelerator may have the form of a rectangular pyramid 55 covered by filter panels. Filter panels are made of a strong net, to avoid clogging of the converter by debris and prevent fish entrapment.

The small outlet area 56 of the accelerator 22 is incorporated into the central opening of the front panel of the turbine unit 21. Said water flow accelerator directs the incoming water flow to the working parts of the left and right turbines, forcing them to turn in mutually opposite directions, while blocking the resting parts of the turbines from incoming water. Such assembly increases the water velocity through the turbines and reduces resistance to the turbine's rotation, thereby enhancing the power output of the converter.

The turbine unit 21 employs two counter-rotating turbines 23 and 24, which are mounted side by side in order to neutralize the twisting moment produced by each turbine. Such arrangement allows the system module to automatically maintain an optimum heading to the river stream. This configuration also gives an additional advantage for using a simple and effective mooring mechanism.

The self-adjusting buoyant mooring mechanism (FIGS. 1 and 10) includes the pontoon 60, the converter-lifting winch 61 which is incorporated into the stern part of the pontoon, the wheel 62 positioned at the centre of the bottom side of the inlet area of the converter 63, the pair of wheels 64 and 65 attached to the bottom side of the outlet area of the converter 63, and the mooring line 66 running from the front part of the converter 63 to the anchor 67. The front part of the pontoon 60 is pivotally secured to the top side of the inlet area of the converter 63. The winch rope 68 limits the range of a vertical rotation of the converter from 0 to preferably 30 degrees. This angle will decrease in shallow water conditions after wheels 64 and 65 hit the floor 70, and increase to its limit with increasing water depth.

It is known that the highest speed of a water stream is at its surface, but it drops down fast with increase in the depth level. It was experimentally determined in this work that the water flow velocity through the turbine unit is greatest when the inlet is located close to the water surface while the converter is tilted down at approximately 30 degrees. Said buoyant mooring mechanism allows this configuration, thus increasing the converter's efficiency.

Furthermore, said buoyant mooring mechanism allows the converter to operate optimally in conditions of varying water levels 69 (FIG. 9) which may be subject to various external factors such as rainfall or drought.

The system module, securely moored to the river or channel bed, orients itself into the water current like a boat at anchor. It is cheap and simple to assemble, dismantle, and transport for relocation.

One or more of said modules can be placed in a river or channel for the purpose of generating electricity or pumping water. The electricity produced by the system can be transmitted through flexible underwater cables to a shore. After employing appropriate voltage regulators and transformers, the generated power can then be supplied to consumers via a power-distributing network.

Unlike the previous efforts to generate electricity from water currents, the present invention surpasses the efficiencies of known free-flow hydro energy devices because its design uses a novel water current energy converter capable of self-adjusting to an optimal position in conditions of varying water flow levels and directions. Because of this novel design, torque can be gained by increasing the turbine unit's horizontal dimension instead of increasing its vertical dimension, which allows it to be used in shallow water currents with a very low head. Furthermore, increasing the turbine's horizontal dimensions does not significantly decrease the velocity of the conveyor mechanism, which consequently eliminates the necessity of a speed increaser for larger turbine sizes. Also, this technology drastically reduces material strength requirements for the turbine's blades, making it highly cost-effective. In summary, this invention adapts perfectly for the wide market segment—areas with both deep and shallow water currents, therefore providing a significant advantage to the prior art.

The present invention is not to be limited by what has been particularly shown and described, except as indicated by the appended claims.

The embodiments of the invention in which an exclusive property or privilege is claimed are defined as follows:

1. A system for generating electricity from water currents comprising a plurality of buoyant modules, wherein each of said modules includes:
   a. a power unit housing, having the front, back, top, bottom, right, and left sides;
   b. screen panels covering said front, top, bottom, right, and left sides of said power unit housing, said front screen panel having an opening in its center for the entrance of a water flow into said power unit housing;
   c. left and right conveyor mechanisms are connected to inner vertically-oriented shafts, wherein said vertically-oriented shafts are mounted via bearings to the top and bottom sides of said power unit housing, said conveyor mechanisms mounted side by side, wherein said left conveyor mechanism is mounted to rotate by the water flow in the clockwise direction while said right conveyor mechanism is mounted to rotate by the water flow in the counterclockwise direction, thus neutralizing the twisting moment produced by each conveyor mechanism;
   d. electrical generators attached to said power unit housing and coupled to said vertically-oriented shafts to transform the mechanical energy of said conveyor mechanisms into electricity;
   e. a vertically oriented panel separating said conveyor mechanisms;
   f. a V-shaped water flow accelerator having the front, back, top, bottom, right, and left sides;
   g. screen panels covering the top, bottom, right and left sides of said water flow accelerator;
   h. a filter panel covering the front side of said water flow accelerator to prevent clogging of said water flow accelerator and said power unit housing with debris or fish entrapment;
   i. the back side of said water flow accelerator incorporated into said opening of said front screen panel of said power unit housing for directing the incoming water flow through the power generating parts of said conveyor mechanisms while blocking the opposite non-power generating parts of said conveyor mechanisms from the incoming water flow and forcing said conveyor mechanisms to turn in mutually opposite directions;
   j. a self-adjusting mooring mechanism comprising a wheel positioned at the centre of the bottom side of the inlet area of said water flow accelerator, a pair of wheels attached to the bottom side edges of the outermost stern part of said power unit housing, mooring lines running from the bottom side of the inlet area of said water flow accelerator to an anchor, a pontoon pivotally secured to the top side of the inlet area of said water flow accelerator, thus enabling said water flow accelerator and said power unit housing to tilt within an angle ranging between 0 and 30 degrees, limited by the lifting winch incorporated into the stern part of said pontoon, thus providing said water flow accelerator with an additional acceleration of the incoming water flow.

2. The system for generating electricity from water currents of claim 1, wherein each of said conveyor mechanisms comprises:
   a. a top endless loop flexible element, passing between sprockets mounted on the upper ends of said vertically-oriented shafts;
   b. a bottom endless loop flexible element, passing between sprockets mounted on the lower ends of said vertically-oriented shafts;
   c. a set of attachments built into said top endless loop flexible element;
   d. a set of attachments built into said bottom endless loop flexible element;
   e. a set of blade support members, wherein each of said support members resembles a step ladder comprising two identical hinged sections with built-in crossbars, the base ends of each said section are pivotally mounted to attachments of said top and bottom endless loop flexible elements in such a way that the hinge axis of each said support member is parallel to said vertically-oriented shafts and said blade support members are positioned at regular intervals from one another;
   f. a set of vertically-oriented blades having a rectangular-like geometry and an added fin, said blades are pivotally secured by their leading edges to the hinge axis of said respective support members, the free rotation of said blades on the power generating side of said conveyor mechanism is limited by the trailing sections of said support members so as to maximally intercept the incoming water flow while the added fin enhances a self-starting ability of the system;
   g. a vertically oriented panel located between the vertically oriented shafts of said conveyor mechanism, thus separating the power generating part of said conveyor mechanism from its opposite non-power generating part.

\* \* \* \* \*